(12) United States Patent     (10) Patent No.: US 11,503,033 B2
Dandekar et al.     (45) Date of Patent: *Nov. 15, 2022

(54) USING ONE OR MORE NETWORKS TO ASSESS ONE OR MORE METRICS ABOUT AN ENTITY

(71) Applicant: Stripe, Inc., San Francisco, CA (US)

(72) Inventors: Pranav Dandekar, Palo Alto, CA (US); Peter Lofgren, Palo Alto, CA (US); Ashish Goel, Stanford, CA (US)

(73) Assignee: Stripe, Inc., San Francisco, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 16/593,702

(22) Filed: Oct. 4, 2019

(65) Prior Publication Data

US 2020/0036721 A1     Jan. 30, 2020

Related U.S. Application Data

(63) Continuation of application No. 15/699,808, filed on Sep. 8, 2017, now Pat. No. 10,469,504.

(51) Int. Cl.
*G06F 21/50*     (2013.01)
*G06F 15/16*     (2006.01)
*H04L 9/40*     (2022.01)

(52) U.S. Cl.
CPC ............ *H04L 63/102* (2013.01); *G06F 21/50* (2013.01); *G06F 15/16* (2013.01); *H04L 63/0263* (2013.01)

(58) Field of Classification Search
CPC ... H04L 63/102; H04L 63/0263; G06F 21/50; G06F 15/16

(Continued)

(56) References Cited

U.S. PATENT DOCUMENTS 6,330,546 B1    12/2001    Gopinathan et al.
7,249,094 B2    7/2007    Levchin et al.
(Continued)

FOREIGN PATENT DOCUMENTS

WO     2015191741 A1     12/2015

OTHER PUBLICATIONS

"U.S. Appl. No. 15/699,808, Notice of Allowance dated Jun. 19, 2019", 20 pgs.

(Continued)

*Primary Examiner* — Jason K Gee
*Assistant Examiner* — Thanh T Le
(74) *Attorney, Agent, or Firm* — Schwegman Lundberg & Woessner, P.A.

(57) ABSTRACT

Described herein are systems and methods for predicting a metric value for an entity associated with a query node in a graph that represents a network. In embodiments, using a user's profile as the query node, a metric about that user may be estimated based, at least in part, as a function of how well connected the query node is to a whitelist of "good" users/nodes in the network, a blacklist of "bad" users/nodes in the network, or both. In embodiments, one or more nodes or edges may be weighted when determining a final score for the query node. In embodiments, the final score regarding the metric may be used to take one or more actions relative to the query node, including accepting it into a network, allowing or rejecting a transaction, assigning a classification to the node, using the final score to compute another estimate for a node, etc.

17 Claims, 10 Drawing Sheets

(58) Field of Classification Search
USPC .......................................................... 726/4
See application file for complete search history.

(56) References Cited

U.S. PATENT DOCUMENTS

| | | | |
|---|---|---|---|
| 7,959,074 B1 | 6/2011 | Chopra et al. | |
| 8,560,385 B2 | 10/2013 | Atazky et al. | |
| 8,560,436 B2* | 10/2013 | Ingram | G06Q 40/02 705/26.1 |
| 8,826,444 B1* | 9/2014 | Kalle | H04N 21/6175 709/224 |
| 8,904,520 B1* | 12/2014 | Nachenberg | G06F 21/564 726/22 |
| 10,469,504 B1 | 11/2019 | Dandekar et al. | |
| 2006/0212930 A1* | 9/2006 | Shull | G06F 21/577 726/10 |
| 2006/0212931 A1* | 9/2006 | Shull | H04L 63/104 726/10 |
| 2008/0228746 A1 | 9/2008 | Markus et al. | |
| 2008/0275833 A1 | 11/2008 | Zhou | |
| 2009/0193293 A1* | 7/2009 | Stolfo | G06F 21/56 714/E11.002 |
| 2011/0185436 A1* | 7/2011 | Koulinitch | H04L 63/10 726/28 |
| 2011/0252044 A1 | 10/2011 | Shin | |
| 2012/0246720 A1* | 9/2012 | Xie | H04L 51/212 726/22 |
| 2012/0290482 A1 | 11/2012 | Alef et al. | |
| 2012/0330864 A1 | 12/2012 | Chakrabarti | |
| 2013/0226934 A1 | 8/2013 | Brautbar | |
| 2014/0297740 A1* | 10/2014 | Narayanan | H04L 67/306 709/204 |
| 2015/0135256 A1* | 5/2015 | Hoy | H04L 63/0263 726/1 |
| 2015/0188941 A1* | 7/2015 | Boshmaf | H04L 63/1441 726/22 |
| 2016/0182451 A1* | 6/2016 | Nandagopal | H04L 63/1441 726/11 |
| 2017/0111364 A1* | 4/2017 | Rawat | G06F 21/316 |
| 2017/0237764 A1* | 8/2017 | Rasumov | G06F 21/562 726/25 |
| 2019/0114373 A1 | 4/2019 | Subbian | |

OTHER PUBLICATIONS

"U.S. Appl. No. 15/699,808, Notice of Allowance dated Sep. 18, 2019", 6 pgs.

"U.S. Appl. No. 15/699,808, Notice of Allowance dated Oct. 2, 2019", 8 pgs.

Lofgren et al., Personalized PageRank Estimation and Search: A Bidirectional Approach, arXiv:1507.05999v2 [cs.DS] Jul. 30, 2015, <URL:https://pdfs.semanticscholar.org/2e97/55294bfcebbe2d6bbdc7937cf76f25d605fc./> (11 pgs).

R. Anderson et al, "Local Computation of PageRank Contributions" Local Computation of PageRank Contributions, 2007 (16 pgs).

Z. Gyongyi et al., "Combating Web Spam with TrustRank," Proceedings of the 30th VLDB Conference, Toronto, Canada, 2004 (12pgs).

V. Romero et al., "Tetris Agent Optimization Using Harmony Search Algorithm" Jan. 2011, <URL:https://www.researchgate.net/publication/265566527/> (30 pgs).

Wikipedia,"TrustRank," [online], [retrived Mar. 24, 2017]. Retrieved from Internet <URL:https://en.wikipedia.org/wiki/TrustRank> (1 page).

* cited by examiner

300

For each node, w, in a set of whitelist nodes, determine a score that measures a strength of connection from w to a query node, q (i.e., a score that measures a strength of connection of node q with respect to w) ⎯ 305

Generate a whitelist blended value over the whitelist nodes in the set of whitelist nodes, in which the whitelist blended value represents a positive value of a metric for the query node ⎯ 310

For each node, $b$, in a set of blacklist nodes, determine a score that measures a strength of connection from a query node, $q$, to node $b$ (i.e., a score that measures a strength of connection of node $b$ with respect to $q$) — 405

Generate a blacklist blended value over nodes in the blacklist, in which the blacklist blended value represents a negative reputation of the query node — 410

FIG. 4

USING ONE OR MORE NETWORKS TO ASSESS ONE OR MORE METRICS ABOUT AN ENTITY

CROSS-REFERENCE TO RELATED APPLICATION

This patent application is a continuation of and claims the priority benefit of co-pending and commonly owned U.S. patent application Ser. No. 15/699,808, filed on 8 Sep. 2017, entitled "SYSTEMS AND METHODS FOR USING ONE OR MORE NETWORKS TO ASSESS A METRIC ABOUT AN ENTITY," listing Pranav Dandekar, Peter Lofgren, and Ashish Goel as inventor, which patent document is incorporated by reference herein in its entirety and for all purposes.

BACKGROUND

Over the last several years, the world has become ever more increasingly connected. These connections may occur at the physical level with internetworked computing devices, which form private networks or public networks, such as the Internet.

Connections also occur at other levels. Using networked computing devices, people, governments, non-profits, organizations, and businesses form connections between and among these various groups for myriad reasons. For example, social networks can be formed that link individuals and entities through a social network application. Or, business entities may be interconnected to provide services, such as business or financial services.

As the connectivity grows, more and more interactions occur at a distance and over a network. Sometimes the interacting entities know each other; however, as both the number and sizes of networks grow, it is becoming more common that interactions occur between entities that do not know each other or have not previously interacted.

There are several issues when entities that are not well known to each other interact. One such issue with network interactions is uncertainty about an entity's reputation, such as its trustworthiness or creditworthiness. For example, Entity A may not want to interact with Entity B via a networked service, be it joining the same user group, buying a product, selling a product, being linked as acquaintances, or the like, without first having some sense of the trustworthiness of Entity B. However, gauging an entity's reputation is very difficult. Self-reporting cannot be relied upon because a bad entity may misrepresent their reputation. Third-party verification services can sometimes be used to help understand an entity's reputation, but services often have limited metrics and insights. The information provided by third-party service providers may also be dubious as they too may have been deceived, may have relied upon incorrect data, or may have generated their data based upon incorrect assumptions.

Accordingly, what is needed are improved systems and methods for gauging one or more metrics about one or more properties about an entity (e.g., the entity's reputation) that is based, at least in part, on associations of the entity with other entities in one or more networks.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 3 depicts an example method for estimating a metric for a query node relative to one or more whitelist nodes in a graph, according to embodiments of the present disclosure.

FIG. 4 depicts an example method for estimating a metric for a query node relative to one or more blacklist nodes in a graph, according to embodiments of the present disclosure.

DETAILED DESCRIPTION OF EMBODIMENTS

Figure 1:
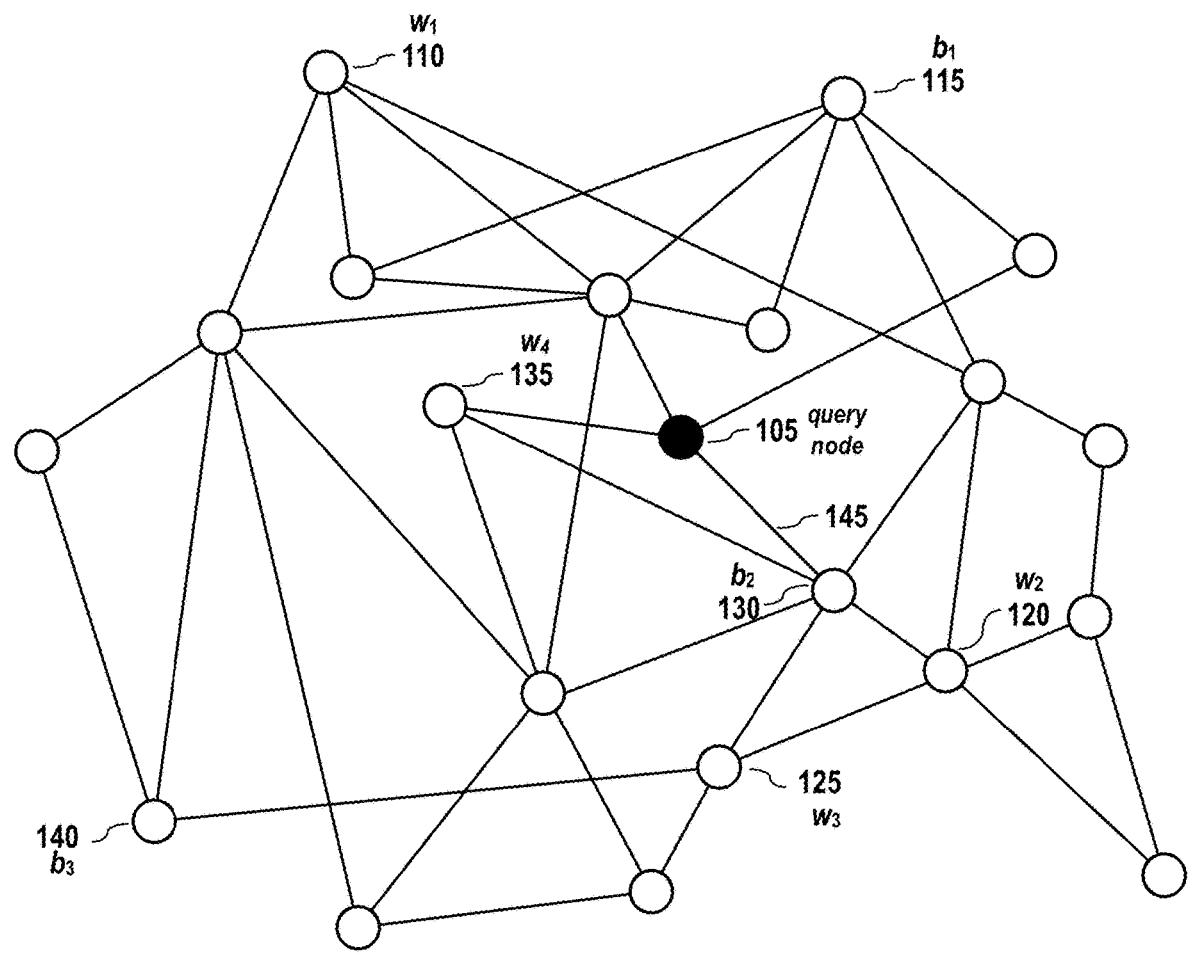
FIG. 1 illustrates a graphical depiction of a network where entities are nodes and edges represent a relationship between nodes, according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent disclosure is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

There are a growing number of networks and networked services where a first entity (e.g., a service provider) may not have a pre-existing relationship with a second entity (e.g., a potential new user). It is important for these providers to be able to use a metric or value to determine the chance a new user will commit fraudulent or other harmful acts. For example, it would be extremely beneficial to estimate the trustworthiness or fraudulence level of a potential new user to a service when they first sign up—even without waiting to see their activities on the service.

Accordingly, disclosed herein are example embodiments of systems and methods for using one or more interaction networks to help gauge a metric about a user. Utilizing the user's profile as a node in a graph formed from that network, a metric about the user may be estimated based, at least in part, as a function of how well-connected (e.g., density of connections, distance, etc.) the user is to pre-classified nodes (e.g., whitelist of "good" users/nodes in the network, a blacklist of "bad" users/nodes in the network, or both). In embodiments, pre-classification may be an identifier or a numerical value.

Networks that involve the interworking of entities (e.g., people, businesses, non-profits, governmental agencies, etc.) may be formed into graphs that represent the entities and at least some of the interactions between those entities. For example, in embodiments, given an interactive service or services, such as a social network, entities that are users of that service may be depicted as nodes, and edges may denote friendship, acquaintance, interactions, transactions, and the like.

FIG. 1 illustrates a graphical depiction of an example network where entities are nodes (e.g., nodes 105-135) and edges (e.g., edge 145 between node 105 and node 130) represent a relationship between those nodes, according to embodiments of the present disclosure. For example, FIG. 1 show nodes 105-140, among other nodes. Also shown in FIG. 1 are edges, such as edge 145 between node 105 and node 130, which represents a connection between node 105 and node 130. In embodiments, a graph, like that depicted in FIG. 1 may be used to predict or estimate a metric regarding a query node (node 105) based upon a strength of connection using the edges and using a whitelist of "good" entity nodes (e.g., nodes $w_1$ 110, $w_2$ 120, $w_3$ 125, etc.), a blacklist of "bad/malicious" entity nodes (e.g., nodes $b_1$ 115, $b_2$ 130, $b_3$ 140, etc.), or both.

Many approaches may be used to gauge a strength of connection between nodes, including Personalized Page Rank, Average Personalized Page Rank, Maxflow, Approximate Personalized Page Rank, shortest path length between nodes, the number of unique paths between nodes, and the approaches described in International PCT Publication No. WO 2015/191741 A1 and its US counterpart application U.S. Pat. Appl. No. 62/010,393 (each of which is incorporated by reference herein in its entirety), among other approaches.

Figure 2:
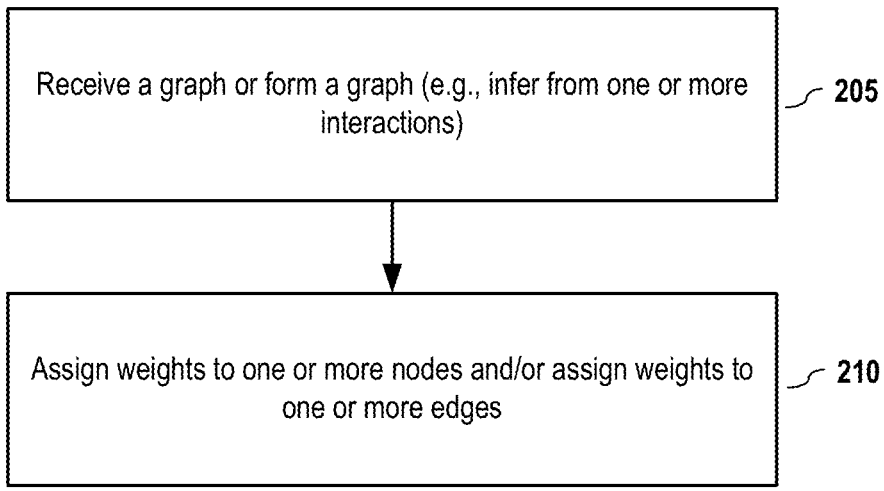
FIG. 2 depicts an example method for generating a graph, according to embodiments of the present disclosure.

FIG. 2 depicts an example method for generating a graph according to embodiments of the present disclosure. In embodiments, a graph may be received that has already been formed. Alternatively, a graph or graphs may be formed (205) using entities (e.g., profiles from a networking service) as nodes and connections (such as friendship, acquaintance, calls, texts, message, interactions, transactions, etc.) as edges. In embodiments, one or more of the connections may be inferred from one or more interactions between entities.

In embodiments, nodes, edges, or both may include one or more attributes associated with it. For example, a node may include attributes about an entity, such as name, user name, address, contact information, bank account, IP address, device ID, telephone numbers, card numbers, or other data.

In embodiments, nodes, edges, or both in the network may be weighted (210). For example, the weights of an edge may represent or be a function of the degree of trust, frequency of interaction, number/volume of transactions, number of ratings/reviews, types of interactions, etc.

B. Estimating a Metric Using Whitelist Nodes, Blacklist Nodes, or Both

In the following sections, a metric may be estimated or predicted using a graph and a set of whitelist nodes, a set of blacklist nodes, or both. For purposes of illustration, reputation is the metric, but one skilled in the art shall recognize that other metrics may be used.

1. Estimating a Metric Using Whitelist Entities

FIG. 3 depicts an example method for estimating a metric for a query node relative to one or more whitelist nodes in a graph, according to embodiments of the present disclosure. In embodiments, for each node, w, in a set of whitelist nodes, a score is determined (305) that measures a strength of connection from w to a query node, q (i.e., a score that measures a strength of connection of node q with respect to w). For example, any of the previously mentioned methods (e.g., Personalized PageRank (PPR), maximum flow, etc.) or other methodologies that gauges a strength of connection between the whitelist node, w, and the query node, q, may be used.

In embodiments, where the set of whitelist nodes includes more than one whitelist node, the whitelist scores obtained for the query node relative to the various whitelist nodes may be combined (310) to obtain a whitelist blended value.

In embodiments, this whitelist blended value or score may represent a "positive" reputation score of the query node. In embodiments, the blending may be done by summing the individual whitelist scores, averaging the scores over the number of whitelist nodes in the set of whitelist nodes, or other combining methodologies.

For example, in embodiments, blending may include weighting the whitelist scores when combining them. In embodiments, one or more weight values associated with an edge or edges between a whitelist node and the query node may be used to weight the score for that whitelist node when combining it with other weighted scores. Alternatively, or additionally, one or more weight values associated with the whitelist node may be used to weight the score for that whitelist node. One example method for combining whitelist scores s to obtain a whitelist blended score for the query node q given a set of t whitelist nodes having edge weights e and node weights n may be as follows:

$$\text{whitelist blended score}_q = \frac{1}{t}\sum_{i=1}^{t} e_i n_i s_i, \quad (1)$$

where $s_i$ is the whitelist score of the ith whitelist node $w_i$, $e_i$ is an edge weight value associated with a pathway in the graph between the query node q and the whitelist node $w_i$, and $n_i$ is a node weight value associated with the whitelist node $w_i$.

In embodiments, a node weight value may be a peer-assigned rating value, a company-assigned rating value, a history of interactions rating (in which certain actions may be given positive scores and other actions may be given negative scores), a credit score, a whitelist score, one or more other rankings or metrics that indicate a quality of the entity associated with the whitelist node, or combinations thereof. In embodiments, where the node weight value includes a whitelist score, the values may be recursively computed until a stop condition has been reached. A stop condition may be a number of iterations, convergence of one or more values within a threshold amount or amounts, divergence, or the like. In embodiments, where the node weight value includes a whitelist score, the node weight values may be assigned an initialization value at the beginning of the recursive process.

In embodiments, the edge weight value of the edge pathway may be an average of edge values of a path between the query node and the whitelist node. Additionally, or alternatively, the edge weight value may include a penalty or reduced weighting the further the whitelist node is from the query node. That is, a closer connection between a whitelist node and the query node may be weighted more than a more-distant connection.

Having obtained a whitelist blended score for the query node, it can be used in several ways. In embodiments, it may be used to decide whether to authorize an action related to the query node. For example, the whitelist blended score may be used to determine whether to accept the entity associated with the query node to join a service. Or, the whitelist blended score may be used to determine whether to allow a financial or other type of transaction involving the entity associated with the query node. In embodiments, as discussed above, the whitelist blended score may be used in a recursive manner to assign whitelist blended scores to nodes in the graph. One skilled in the art shall recognize that a whitelist score may be applicable in other uses.

2. Estimating a Metric Using Blacklist Entities

FIG. 4 depicts an example method for estimating a metric for a query node relative to one or more blacklist nodes in a graph, according to embodiments of the present disclosure. In embodiments, for each node, b, in a set of blacklist nodes, a score is determined (405) that measures a strength of connection from a query node, q, to the blacklist node, b (i.e., a score that measures a strength of connection of node b with respect to node q). For example, any of the previously mentioned methods (e.g., Personalized PageRank (PPR), maximum flow, etc.) or other methodologies that gauges a strength of connection between the blacklist node, w, and the query node, q, may be used.

In embodiments, where the set of blacklist nodes includes more than one blacklist node, the blacklist scores obtained relative to the various blacklist nodes may be combined (410) to obtain a blacklist blended value over nodes in the blacklist. In embodiments, this blacklist blended value or score may represent a "negative" reputation score of the query node. In embodiments, the blending may be done by summing the individual blacklist scores, averaging the scores over the number of blacklist nodes in the set of blacklist nodes, or other combining methodologies.

For example, in embodiments, blending may include weighting the blacklist scores when combining them. In embodiments, one or more weight values associated with an edge or edges between a blacklist node and the query node may be used to weight the score for that blacklist node when combining it with other weighted scores. Alternatively, or additionally, one or more weight values associated with the blacklist node may be used to weight the score for that blacklist node. One example method for combining blacklist scores s to obtain a blacklist blended score for the query node q given a set of t blacklist nodes having edge weights e and node weights n may be as follows:

$$\text{blacklist blended score}_q = \frac{1}{t}\sum_{i=1}^{t} e_i n_i s_i, \quad (2)$$

where $s_i$ is the blacklist score of the ith blacklist node $b_i$, $e_i$ is an edge weight value associated with a pathway in the graph between the query node q and the blacklist node $b_i$, and $n_i$ is a node weight value associated with the blacklist node $b_i$.

In embodiments, a node weight value may be a peer-assigned rating value, a company-assigned rating value, a credit score, a history of interactions rating (in which certain actions may be given positive scores and other actions may be given negative scores), a blacklist score, one or more other rankings or metrics that indicate a quality of the entity associated with the blacklist node, or combinations thereof. In embodiments, where the node weight value includes a blacklist score, the values may be recursively computed until a stop condition has been reached. A stop condition may be a number of iterations, convergence of one or more values within a threshold amount or amounts, divergence, or the like. In embodiments, where the node weight value includes a blacklist score, the node weight values may be assigned an initialization value at the beginning of the recursive process.

In embodiments, the edge weight value of the edge pathway may be an average of edge values of a path between the query node and the blacklist node. Additionally, or alternatively, the edge weight value may include a penalty or increased weighting the closer the blacklist node is to the query node. That is, a closer connection between a blacklist node and the query node may be weighted more than a more-distant connection.

Having obtained a blacklist blended score for the query node, it can be used in several ways. In embodiments, it may be used to decide whether to authorize an action related to the query node. For example, the blacklist blended score may be used to determine whether to accept the entity associated with the query node to join a service. Or, the blacklist blended score may be used to determine whether to allow a financial or other type of transaction involving the entity associated with the query node. In embodiments, as discussed above, the blacklist blended score may be used in a recursive manner to assign blacklist blended scores to nodes in the graph. One skilled in the art shall recognize that a whitelist score may be applicable in other uses.

3. Estimating a Metric Using Whitelist and Blacklist

Figure 5:
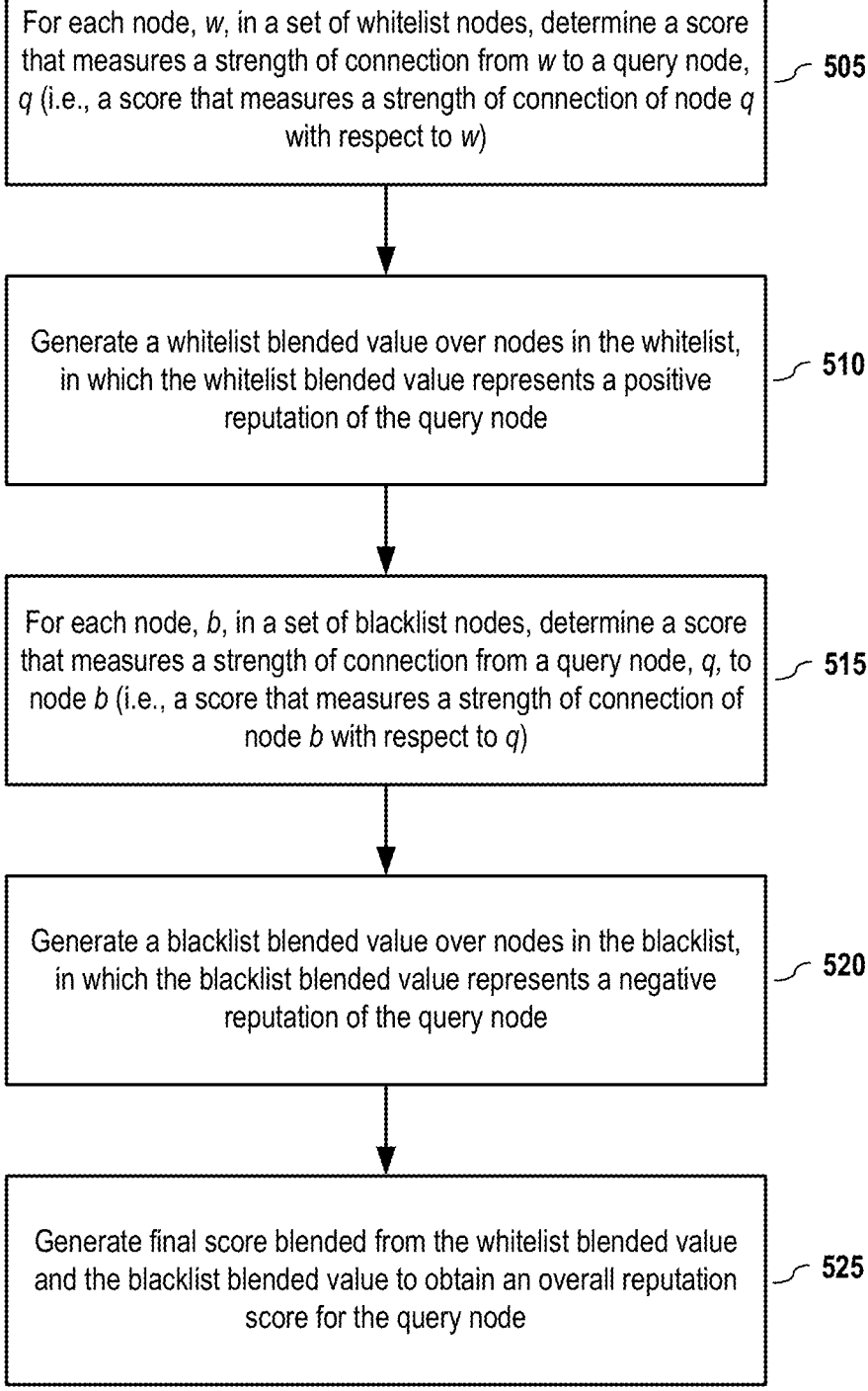
FIG. 5 depicts an example method for estimating a metric for a query node relative to one or more whitelist nodes and one or more blacklist nodes in a graph, according to embodiments of the present disclosure.

FIG. 5 depicts an example method for estimating a metric for a query node relative to one or more whitelist nodes and one or more blacklist nodes in a graph, according to embodiments of the present disclosure. In embodiments, the methods of FIGS. 3 and 4 may be combined to produce a blended score for a query node using both a set of whitelist nodes and a set of blacklist nodes.

In embodiments, for each node, w, in a set of whitelist nodes, a score is determined (505) that measures a strength of connection of a query node, q, with respect to the whitelist node. If the set includes a plurality of whitelist nodes, a whitelist blended value may be computed (510), in which the whitelist blended value represents a positive reputation of the query node. The blended value may be obtained using one or more of the methods discussed previously.

In embodiments, for each node, b, in a sets of blacklist nodes, a score is determined (515) that measures a strength of connection from the blacklist node with respect to the query node, q. If the set includes a plurality of blacklist nodes, a blacklist blended value may be computed (520), in which the blacklist blended value represents a negative reputation of the query node. The blended value may be obtained using one or more of the methods discussed previously.

Finally, in the depicted embodiment shown in FIG. 5, a final score blended from the whitelist blended value and the blacklist blended value is computed (525) to obtain an overall reputation score for the query node. In embodiments, the final blending may be a sum of the two scores or may be a weighted sum. In embodiments, the steps of obtaining blended values (i.e., steps 510, 520, and 525) may be combined into one step. For example, in embodiments, Equations (1) and/or (2) may be used to combined all scores (whitelist scores and blacklist scores), in which whitelist scores have positive values and blacklist scores have negative values. Thus, a net positive score may be interpreted to mean that the query node is a whitelist node and a negative score would mean that the query node is a blacklist node. One skilled in the art shall recognize that a final score for a query node, q, may be determined in other ways. For example, in embodiments, the following equation may be used:

$$\text{final score}_q = \frac{\text{whitelist blended score}_q}{(\text{whitelist blended score}_q + \text{blacklist blended score}_q)} \quad (3)$$

Alternatively, combining whitelist blended and blacklist blended scores may be done using machine learning. For example, logistic regression or a random forest may be used to predict a factor about a user associated with a node, such as whether a user will repay a loan or behave well. In embodiments, the whitelist and blacklist scores may be features, along with other features, to prediction or classification.

In embodiments, the final score may be used in like manner as discussed above with respect to the whitelist blended score and the blacklist blended score.

4. Estimating a Metric Using Blacklist in a Strong Network

Certain networks may be considered "strong" networks. These networks are ones in which a connection between nodes represents a strong connection between the entities represented by the nodes in the graph. Examples of strong networks are when entities share an identifier or other piece of information that indicates a close connection. For example, entities may be said to have a strong relationship if they share one or more of the same: phone number, bank account number, device identifier (e.g., Media Access Control (MAC) address of a computing devices), address, driver's license number, passport number, and the like.

Figure 6:
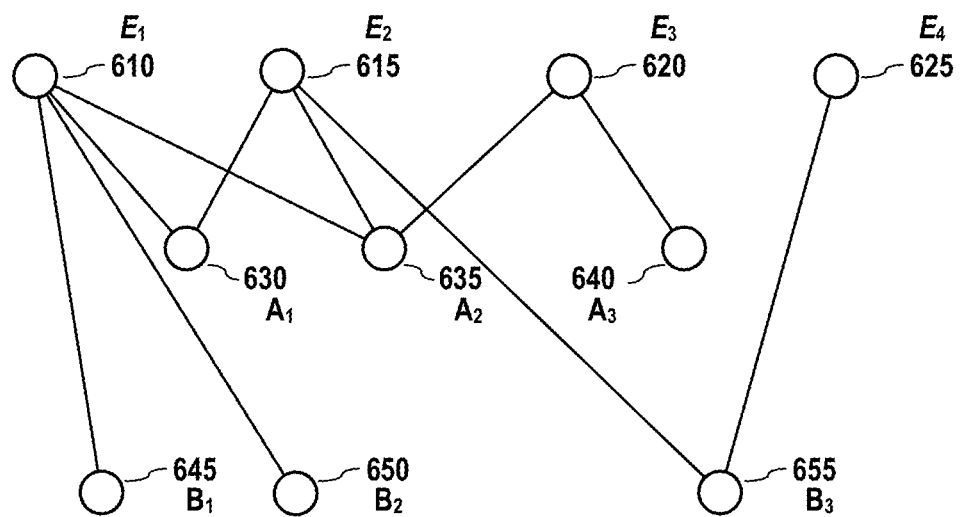
FIG. 6 illustrates a graphical depiction of a "strong" network, where entities are nodes and edges represent a relationship between nodes, according to embodiments of the present disclosure.

FIG. 6 illustrates a graphical depiction of a connected components network, where entities are nodes and edges represent a connection between nodes, according to embodiments of the present disclosure. In the depicted graph, entities, E1 610-E4 625, may be connected by having at least one identifier in common. For example, entity E1 610 is connected entity E2 615 via attribute A1 630, which might be an attribute, which may be IP address. Similarly, E2 615 is also connected to entity E4 625 via attribute B3 655, which may be bank account.

Figure 7:
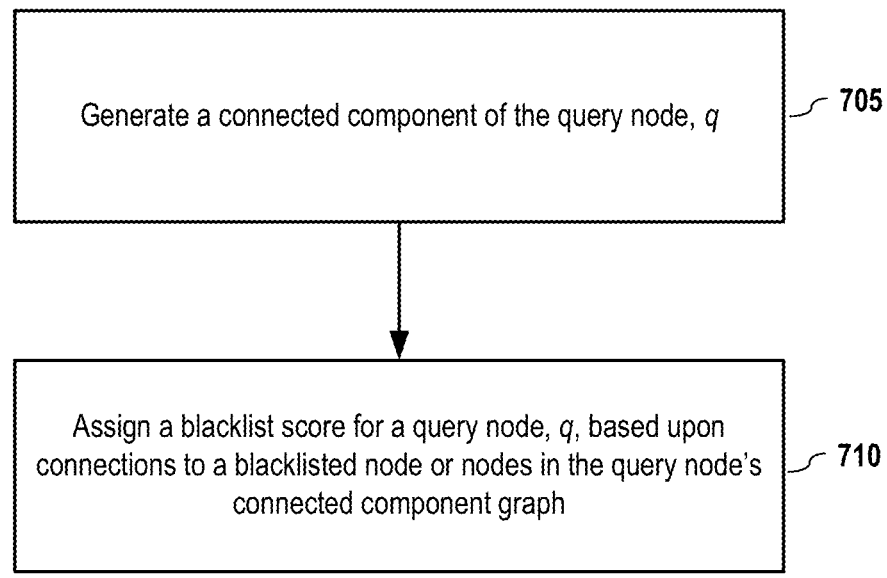
FIG. 7 depicts an example method for estimating a metric for a query node relative to one or more blacklist nodes in a connected components graph, according to embodiments of the present disclosure.

FIG. 7 depicts an example method for estimating a metric for a query node relative to one or more blacklist nodes in a connected components graph, according to embodiments of the present disclosure. In embodiments, for a query node, q, a connected component graph may be generated (705). Then, using the connected component graph, a blacklist score for the query node may be assigned (710). For example, in embodiments, a score may be assigned based upon whether a connected component graph includes both the query node and one or more blacklist nodes. Additionally, or alternatively, a score may be assigned based upon the blacklist nodes that are part of the query node's connected component, such as a blended blacklist value as previously described.

It should be noted that that same or similar computation methods described previously may be used, including weighting the edge, nodes, or both. For example, sharing a mailing address may carry less weight than sharing a bank account. In embodiments, a threshold value may be set in which breach of that value results in the query node being classified as a blacklist node.

5. Multi-Networks

In embodiments, more than one network may be used to estimate a metric regarding a query node. For example, a network based upon emails may be used to generate on network graph, a social network may be used to generate a second graph, and phone calls or text messages may be used to generate a third graph. Alternatively, this data may be combined into fewer graphs. In either event, the values from the different networks may be combined into a final score. In embodiments, there may be weighting between the different networks. For example, a score from the email network may be weighted less than the score from a network that represents phone calls. Also, in embodiments, a connection between the query node and an entity in multiple networks may result in a score for that connection to be increased. That is, a query node that interacts with an entity via different networks is an indicator that there is a stronger connection between those two entities. Thus, in embodiments, scores related to that entity may be weighted more, for example, two or three times a typical weight, although other values may be used.

C. Estimating a Credit Metric Using Whitelist Nodes, Blacklist Nodes, or Both In embodiments, one of the metric that would be beneficial to predict is the creditworthiness of a user based on their social network footprint when they first register for a service. That is, given a whitelist set of high credit users/nodes, the creditworthiness of a user may be estimated as a function of how well connected the user is to the one or more nodes on the whitelist. In embodiments, a credit metric may be obtained using one or more of the methods described above. However, in alternative embodiments, the general approach may be altered due to some subtleties related to creditworthiness. For example, in predicting creditworthiness, the role of bad (e.g., blacklisted) nodes may be less important as it is in computing fraudulence. This approach is based on the premise, established empirically in research, that personal attributes like income, intelligence quotient (IQ), education, and credit (which may be considered to be somewhat correlated to each other) are correlated across the social network.

D. Re-Rank Search Results in a Network According to Approximate Personalized PageRank (PPR)

For a large network graphs, such as those formed from Twitter or Facebook, Personal PageRank (PPR) from a searching node improves the relevance of results; however, due to the high amount of computation, obtaining PPR exactly is often much too slow. Accordingly, in embodiments, faster approaches for estimating or approximating PPR may be used.

Figure 8:
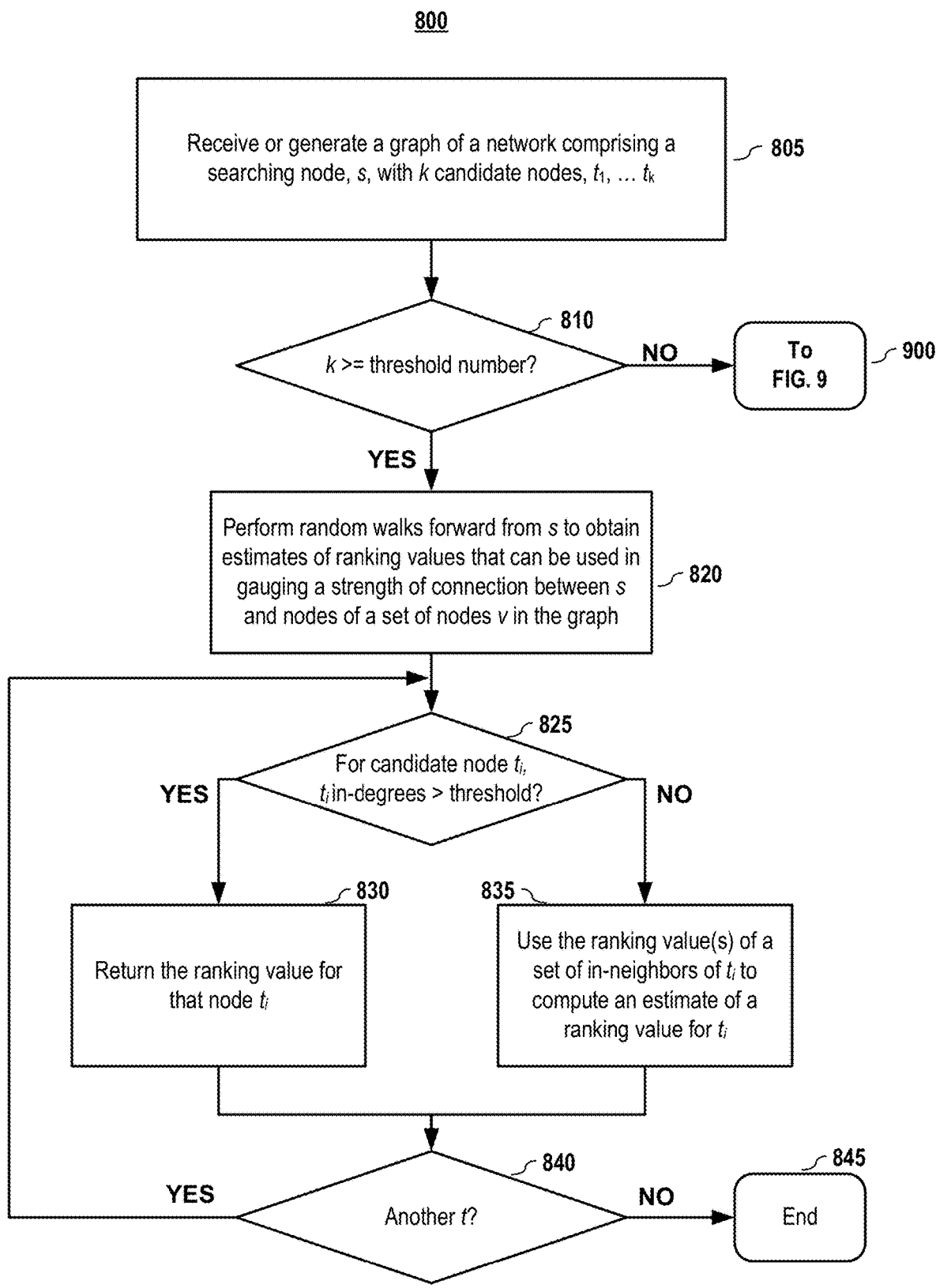
FIGS. 8 & 9 depict an example method for estimating a metric for a query node relative to one or more nodes in a graph, according to embodiments of the present disclosure.
Figure 9:
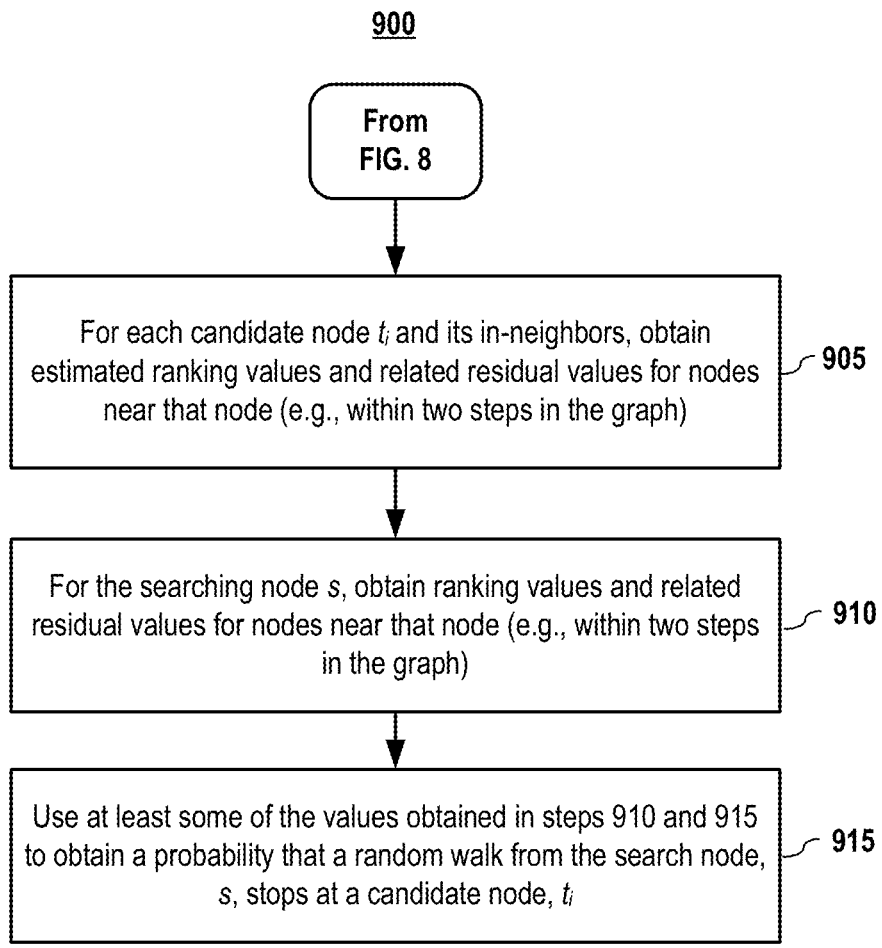

FIGS. 8 & 9 depict an approach for estimating a metric for a query node relative to one or more nodes in a graph, according to embodiments of the present disclosure.

Turning first to FIG. 8, a graph of a network comprising a searching node, s, with k candidate nodes, $t_1, \ldots t_k$, is received or generated (805). In embodiments, if the number of candidate nodes, k, does not exceed a threshold number (e.g., 100,000), then a methodology depicted in FIG. 9 may be performed (900), which shall be described in more detail later. In embodiments, a number random walks (e.g., 500,000 walks) forward from s to obtain estimates of ranking values that gauge (820) or may be used to gauge a strength of connection between s and each node v of a set of nodes v in the graph. For example, given a set of N Monte Carlo random walks on a graph from s, an approximate PPR score (denoted herein as MCPPR) may be determined as follows:

$$MCPPR[s, v] = \frac{\text{number of walks that end on node } v}{N} \quad (4)$$

In embodiments, the MCPPR score may be used as a ranking value that represents or may be used in gauging a strength of connection between nodes s and v.

Returning to FIG. 8, in embodiments, for a candidate node $t_i$, if the number of in-degrees (i.e., incoming connections into that candidate node) is greater than a threshold (for example, 1,000), the MCPPR score is returned (830), which may be used as an estimate of the strength of connection between s and that node $t_i$. In embodiments, if there is not an MCPPR score for that candidate node (i.e., no random walk ended on that node), a zero value or some other default value may be returned.

In embodiments, if the number of in-degrees is not greater than a threshold, a ranking value for $t_i$ may be estimated (835) from ranking values of a set of in-neighbors of $t_i$. For example, the ranking value may be obtained as:

$$\text{Score} = \sum\nolimits_{v \text{ in in-neighbors of } t_i} \left( \frac{MCPPR[s, v] * (1 - c)}{d_v^{out}} \right) \quad (5)$$

where c is a teleportation constant (which is also known as a restart probability). In embodiments, c may be set to 0.3, but other values may be used based upon experimentation. And, where $d_v^{out}$=the out-degree of v (i.e., the number of out-neighbors of v). For example, on Twitter, $d_v^{out}$ is the number of Twitter account node v follows.

In embodiments, a check is performed (840) to determine whether another candidate node still exists for which a strength-of-connection ranking value is to be obtained. If there is another candidate node, the process may return to step 825. If there are no other candidate nodes, the process ends (845).

If the number of candidate nodes did not exceed a threshold value, a strength-of-connection value for the candidate nodes may be obtained using a method depicted in FIG. 9. In embodiments, for each candidate node $t_i$ and each of its in-neighbors, estimated ranking values, which may be Personalize PageRank (PPR) values and related residual values, are obtained (905) for nodes near that node (e.g., within two steps in the graph, although other distances may be used).

For example, in embodiments, a reverse push or pushback methodology may be employed. In embodiments, for nodes, w, that are in-neighbors of a candidate node, $t_i$, and do not have a large number of in-degrees (e.g., over 10,000), the PPR estimate, p[ ], and associated residual value, r[ ], may be obtained as follows:

$$p[w] = \frac{c * (1 - c)}{d_w^{out}} \quad (6)$$

where c is a teleportation constant and may, in embodiments, be set to 0.3 (although other values may be used) and $d_w^{out}$ is the number of out-degrees for node w. Also, in embodiments, the PPR estimate for a candidate node may be initialized to a value, such as 1.

For any node, v, that was reached by at least one of the random walks and is an in-neighbor of an in-neighbor of $t_i$, the residual may be calculated as:

$$r[v] = \sum\nolimits_{w \text{ in in-neighbors of } t_i} \sum\nolimits_{w \text{ in in-neighbors of } v} \frac{(1 - c)^2}{d_v^{out} * d_w^{out}} \quad (7)$$

where c is a teleportation constant and may, in embodiments, be set to 0.3 (although other values may be used), $d_w^{out}$ is the out-degree for node w, and $d_v^{out}$ is the out-degree for node v.

Otherwise, in embodiments, the residual for a node, w, that was not reached by at least one of the random walks and is an in-neighbor of $t_i$, may be calculated as:

$$r[w] = \frac{(1-c)}{d_w^{out}} \quad (8)$$

It should be noted that the condition that the node w have in-degrees below a certain threshold is for sake of computational efficiency—to avoid iterating over large in-neighbor sets. However, it shall be noted that this condition may be changed or removed in embodiments.

Returning to FIG. 9, for the searching node s, Personalize PageRank (PPR) values and related residual values are obtained (910) for nodes near that node (e.g., within two steps in the graph, although other distances may be used). For example, in embodiments, Personalized Page Rank 2 values may be used to help gauge a strength of connection between nodes. Personalized Page Rank 2 (PPR2[s,v]) represents an exact probability that a PPR random walk from node s having a length no greater than two stops at node v. However, in embodiments, it can be computationally expensive to obtain PPR2 values; accordingly, in embodiments, the values may be estimated using PPR2 map as follows:

For nodes, w, that are neighbors of node s and do not have a large number of out-degrees (e.g., over 1,000), for nodes v in the out-neighbors of w, the following may be computed:

$$PPR2\_map[v] = PPR2\_map[v] + \frac{(1-c)^2}{d_s^{out} * d_v^{out}} \quad (9)$$

where c is a teleportation constant and may, in embodiments, be set to 0.3 (although other values may be used), $d_s^{out}$ is the number of out-degrees for node s, and $d_v^{out}$ is the number of out-degrees for node v.

It should be noted that the condition that the node w have out-degrees below a certain threshold is for sake of computational efficiency—to avoid iterating over large in-neighbor sets. However, it shall be noted that this condition may be changed or removed in other embodiments.

Returning to FIG. 9, at least some of the values that obtained in steps 910 and 915 may then be used to obtain a probability that a random PPR walk from the search node, s, stops at a candidate node, $t_i$, which can be used in gauging strength of connection between the search node, s, and the candidate node, $t_1$. In embodiments, this probability may be obtained as follows:

$$PPR[s,t_i] = p_{t_i}[v] + \Sigma_v PPR2[s,v] * r_{t_i}[v] \quad (10)$$

where v is any node within two steps of s. Alternatively, in embodiments, v may be any node with a positive value of PPR2[s, v]. In yet another embodiment, v may be any node, since PPR2[s, v] is 0 for nodes more than two steps from v. In yet another alternative, MCPPR may be used in place of PPR2.

In any event, regardless of the particular embodiment used, a strength of connection is obtained between a searching node, s, and one or more candidate nodes, $t_i$.

It should also be noted that the nodes may be pre-classified (e.g., as whitelist nodes or blacklist nodes) and the values obtains in FIG. 8 and FIG. 9 may be used in combination with one or more of the other methods disclosed herein, including blending the values of classes of nodes. Furthermore, as discussed above, a final value for the query node may be used to classify the query node (i.e., the entity associated with the query node). This classification may be used to take one or more actions relative to the entity associated with the node, such as assigning it a reputation, a creditworthiness, allowing the entity to register or use a system, etc. In embodiments, the classification of the node may also be used in classifying one or more other nodes in the network or that join the network.

E. System Embodiments

In embodiments, aspects of the present patent disclosure may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
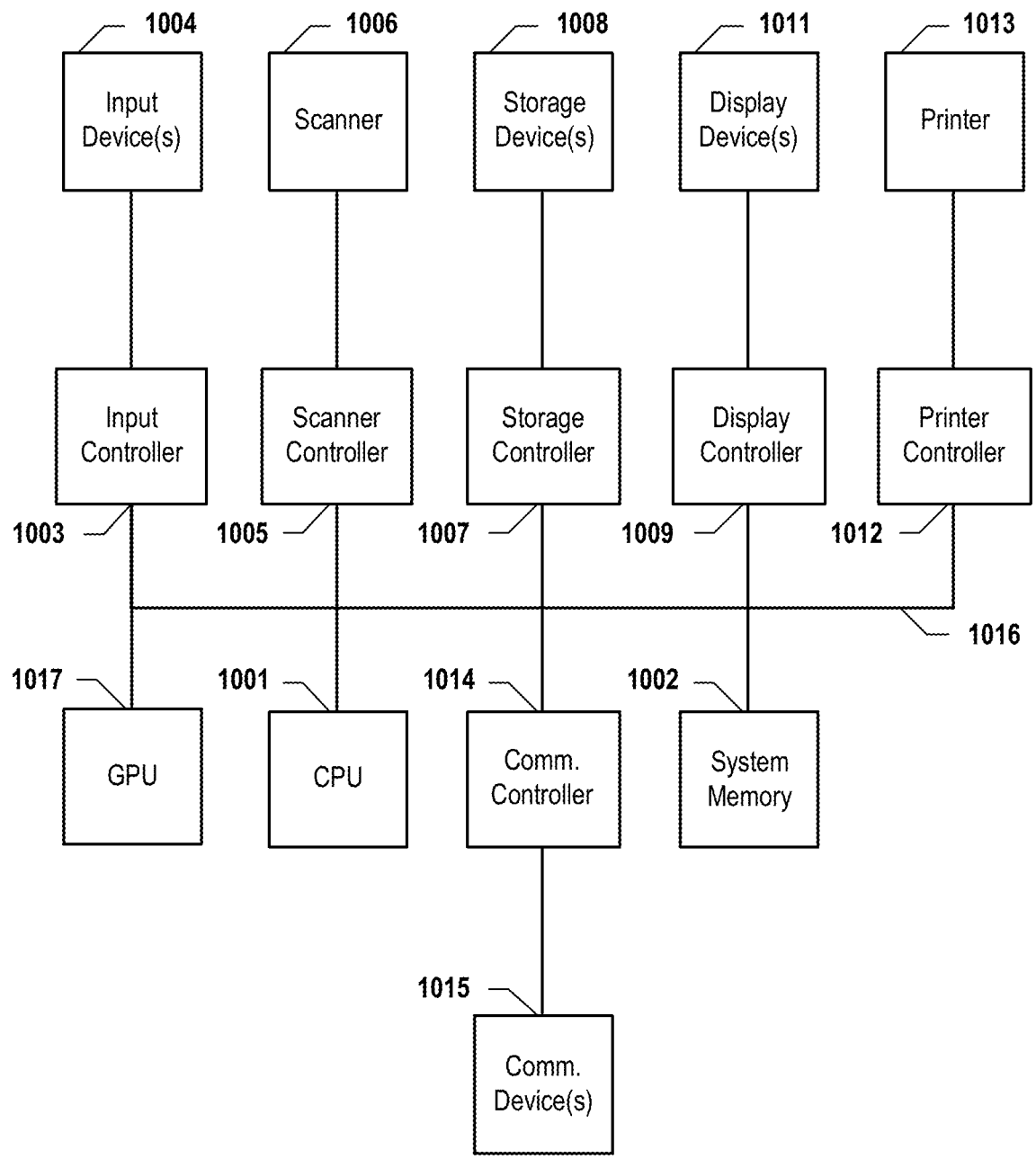
FIG. 10 depicts a simplified block diagram of a computing device/information handling system, in accordance with embodiments of the present disclosure.

FIG. 10 depicts a simplified block diagram of a computing device/information handling system (or computing system) according to embodiments of the present disclosure. It will be understood that the functionalities shown for system 1000 may operate to support various embodiments of an information handling system—although it shall be understood that an information handling system may be differently configured and include different components.

As illustrated in FIG. 10, system 1000 includes one or more central processing units (CPU) 1001 that provides computing resources and controls the computer. CPU 1001 may be implemented with a microprocessor or the like, and may also include one or more graphics processing units (GPU) 1017 and/or a floating point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present invention. Storage device(s) 1008 may also be used to store processed data or data to be processed in accordance with the invention. System 1000 may also include a display controller 1009 for providing an interface to a display device 1011, which may be a cathode ray tube (CRT), a thin film transistor (TFT) display, or other type of display. The computing system 1000 may also include a printer controller 1012 for communicating with a printer 1013. A communications controller 1014 may interface with one or more communication devices 1015, which enables system 1000 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media may include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims, below, may be arranged differently including having multiple dependencies, configurations, and combinations.

What is claimed is:

1. A computer-implemented method, the method comprising:

for each whitelist node in a set of whitelist nodes from at least a first portion of a graph, determining a whitelist score that is related at least in part on a strength of connection between a query node and the whitelist node, the strength of connection being determined based on:

performing a number of random walks in the graph from a start node in the graph and terminating at another node in the graph, the start node corresponding to the query node and the another node corresponding to the whitelist node;

keeping a counter of how many times a walk terminated at a node in the graph;

determining an estimate of the strength of connection between the start node and the another node in the graph based at least in part on dividing the number of times walks terminated on the another node by the number of random walks;

using the estimate of the strength of connection to determine a score that measures the strength of connection between the start node and the another node in the graph;

generating a whitelist blended value comprising a combination of the whitelist scores for the whitelist nodes in the set of whitelist nodes;

for each blacklist node in a set of blacklist nodes from at least a second portion of the graph, determining a blacklist score that is related at least in part on a particular strength of connection between the query node and the blacklist node;

generating a blacklist blended value comprising a combination of the scores for the blacklist nodes in the set of blacklist nodes; and generating an overall score blended from the whitelist blended value and the blacklist blended value for the query node.

2. The computer-implemented method of claim 1 wherein the first portion of the graph and the second portion of the graph are a same portion of the graph.

3. The computer-implemented method of claim 1 further comprising:

obtaining overall scores for a plurality of query nodes from at least a portion of the graph;

responsive to a query node from the plurality of query nodes having an overall score with a first sign, assigning it to the set of whitelist nodes;

responsive to a query node from the plurality of query nodes having an overall score with a second sign, assigning it to the set of blacklist nodes; and selecting a query node and repeating the prior steps until a stop condition is reached to obtain the overall score for the query node.

4. The computer-implemented method of claim 1 further comprising:

generating the graph by determining or inferring one or more interactions or connections between entities, wherein a node in the graph represents an entity and an edge in the graph connects two nodes and represents at least one interaction or connection between those two nodes.

5. The computer-implemented method of claim 4 wherein the graph represents a plurality of different types of networks.

6. The computer-implemented method of claim 5 wherein connections between nodes from one type network are weighted differently than connections from another type of network when determining a strength of connection.

7. The computer-implemented method of claim 4 further comprising:

assigning weights to at least one of: one or more nodes in the graph, one or more edges in the graph, or both; and using at least one of the weights in obtaining the overall score.

8. A system, the system comprising:

one or more processors; and a memory including instructions that, when executed by the one or more processors, cause the one or more processors to perform operations comprising:

for each whitelist node in a set of whitelist nodes from at least a first portion of a graph, determining a whitelist score that is related at least in part on a strength of connection between a query node and the whitelist node, the strength of connection being determined based on:

performing a number of random walks in the graph from a start node in the graph and terminating at another node in the graph, the start node corresponding to the query node and the another node corresponding to the whitelist node;

keeping a counter of how many times a walk terminated at a node in the graph;

determining an estimate of the strength of connection between the start node and the another node in the graph based at least in part on dividing the number of times walks terminated on the another node by the number of random walks;

using the estimate of the strength of connection to determine a score that measures the strength of connection between the start node and the another node in the graph;

generating a whitelist blended value comprising a combination of the whitelist scores for the whitelist nodes in the set of whitelist nodes;

for each blacklist node in a set of blacklist nodes from at least a second portion of the graph, determining a blacklist score that is related at least in part on a particular strength of connection between the query node and the blacklist node;

generating a blacklist blended value comprising a combination of the scores for the blacklist nodes in the set of blacklist nodes; and generating an overall score blended from the whitelist blended value and the blacklist blended value for the query node.

9. The system of claim 8 wherein the operations further comprise:

obtaining overall scores for a plurality of query nodes from at least a portion of the graph;

responsive to a query node from the plurality of query nodes having an overall score with a first sign, assigning it to the set of whitelist nodes;

responsive to a query node from the plurality of query nodes having an overall score with a second sign, assigning it to the set of blacklist nodes; and selecting a query node and repeating the prior steps until a stop condition is reached to obtain the overall score for the query node.

10. The system of claim 8 wherein the operations further comprise:

generating the graph by determining or inferring one or more interactions or connections between entities, wherein a node in the graph represents an entity and an edge in the graph connects two nodes and represents at least one interaction or connection between those two nodes.

11. The system of claim 10 wherein the operations further comprise:

assigning weights to at least one of: one or more nodes in the graph, one or more edges in the graph, or both; and using at least one of the weights in obtaining the overall score.

12. The system of claim 10 wherein the graph represents a plurality of different types of networks.

13. The system of claim 12 wherein connections between nodes from one type network are weighted differently than connections from another type of network when determining a strength of connection.

14. A computer-implemented method, the method comprising:

given a graph that has been generated by determining or inferring one or more interactions or connections between entities, wherein a node in the graph represents an entity and an edge in the graph connects two nodes and represents at least one interaction or connection between those two nodes, for each node in a set of nodes from at least a portion of the graph, determining a score that is related at least in part on a strength of connection between a query node and the node, the strength of connection being determined based on:

performing a number of random walks in the graph from a start node in the graph and terminating at the node in the graph, the start node corresponding to the query node;

keeping a counter of how many times a walk terminated at a particular node in the graph;

determining an estimate of the strength of connection between the start node and the node in the graph based at least in part on dividing the number of times walks terminated on the node by the number of random walks;

using the estimate of the strength of connection to determine a score that measures the strength of connection between the start node and the node in the graph;

combining the scores between the query node and the nodes from the set of nodes to obtain an overall score; and responsive to the overall score being above a threshold value, granting rights to the entity associated with the query node.

15. The computer-implemented method of claim 14 further comprising the step of:

responsive to the overall score being not being above a threshold value, not granting rights to the entity associated with the query node.

16. The computer-implemented method of claim 14 wherein the set of nodes comprises a set of whitelist nodes and a set of blacklist nodes and the method further comprises the step of:

for each whitelist node in the set of whitelist nodes, determining a whitelist score that is related at least in part on a strength of connection between the query node and the whitelist node;

generating a whitelist blended value comprising a combination of the whitelist scores for the whitelist nodes in the set of whitelist nodes;

for each blacklist node in the set of blacklist nodes, determining a blacklist score that is related at least in part on a strength of connection between the query node and the blacklist node;

generating a blacklist blended value comprising a combination of the scores for the blacklist nodes in the set of blacklist nodes; and generating the overall score blended from the whitelist blended value and the blacklist blended value for the query node.

17. The computer-implemented method of claim 16 further comprising:

obtaining overall scores for a plurality of query nodes from at least a portion of the graph;

responsive to a query node from the plurality of query nodes having an overall score with a first sign, assigning it to the set of whitelist nodes;

responsive to a query node from the plurality of query nodes having an overall score with a second sign, assigning it to the set of blacklist nodes; and selecting a query node and repeating the prior steps until a stop condition is reached to obtain the overall score for the query node.

* * * * *